(12) United States Patent
Iwamoto et al.

(10) Patent No.: US 12,280,846 B2
(45) Date of Patent: Apr. 22, 2025

(54) VEHICLE HEADLAMP CAMERA MOUNTING STRUCTURE

(71) Applicant: KAWASAKI MOTORS, LTD., Hyogo (JP)

(72) Inventors: Taro Iwamoto, Hyogo (JP); Takeshi Kashihara, Hyogo (JP); Takafumi Kumada, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/598,661

(22) Filed: Mar. 7, 2024

(65) Prior Publication Data

US 2024/0300606 A1 Sep. 12, 2024

(30) Foreign Application Priority Data

Mar. 8, 2023 (JP) ................................. 2023-035880

(51) Int. Cl.
| | |
|---|---|
| B62J 45/42 | (2020.01) |
| B60Q 1/00 | (2006.01) |
| B62J 6/022 | (2020.01) |
| B62J 45/41 | (2020.01) |
| G03B 17/56 | (2021.01) |

(52) U.S. Cl.
CPC ............ *B62J 45/42* (2020.02); *B60Q 1/0023* (2013.01); *B62J 6/022* (2020.02); *B62J 45/41* (2020.02); *G03B 17/561* (2013.01)

(58) Field of Classification Search
CPC .................................................. B60Q 1/0023
See application file for complete search history.

(56) References Cited

U.S. PATENT DOCUMENTS

| | | | |
|---|---|---|---|
| 11,518,465 B2 | 12/2022 | Neuman et al. | |
| 11,548,589 B2* | 1/2023 | Saeki | ........................ B62J 45/41 |
| 2018/0252380 A1* | 9/2018 | Kitayama | ............ B60Q 1/0035 |
| 2020/0307731 A1 | 10/2020 | Neuman et al. | |
| 2021/0061388 A1 | 3/2021 | Maeda et al. | |
| 2024/0126151 A1* | 4/2024 | Kamijo | .................... B62J 45/42 |

FOREIGN PATENT DOCUMENTS

| | | |
|---|---|---|
| CN | 211252877 U | 8/2020 |
| CN | 212290116 U | 1/2021 |
| CN | 214745454 U | 11/2021 |
| WO | 2020/194170 A | 10/2020 |
| WO | 2022/208721 | 10/2022 |

* cited by examiner

*Primary Examiner* — Robert J May

(74) *Attorney, Agent, or Firm* — GREENBLUM & BERNSTEIN, P.L.C.

(57) ABSTRACT

A vehicle camera mounting structure of the present disclosure is provided in a saddle-riding vehicle such as a motorcycle. The structure includes a camera which captures an image of an area in front of the vehicle and a headlamp which illuminates an area in front of the vehicle. The camera is secured to the headlamp. For instance, the camera is secured to a lower end of the headlamp. It is thereby possible to reduce the labor required to adjust the imaging direction of the camera, by allowing the camera to be oriented in alignment concurrently during an aiming process for the headlamp.

8 Claims, 6 Drawing Sheets

VEHICLE HEADLAMP CAMERA MOUNTING STRUCTURE

CROSS REFERENCE TO THE RELATED APPLICATION

This application is based on and claims Convention priority to Japanese patent application No. 2023-035880, filed Mar. 8, 2023, the entire disclosure of which is herein incorporated by reference as a part of this application.

BACKGROUND OF THE INVENTION

Field of the Invention

The present disclosure relates to a vehicle camera mounting structure, with which a camera that captures an image of an area in front of a vehicle is mounted to the vehicle.

Description of Related Art

Vehicles including a motorcycle have been known in which a camera for capturing an image of an area in front of the vehicle can be equipped with accessories (for example, WO 2022/208721 A1). This camera can be secured to a lower bracket (or a bottom bridge) that supports a front fork.

However, the camera mounting structure in WO 2022/208721 A1 requires cumbersome labor when aligning the imaging direction of the camera, because images taken by the camera must be visually checked to make adjustments.

SUMMARY OF THE INVENTION

A vehicle camera mounting structure, which allows simple adjustment of the imaging direction of a camera, is disclosed and provided herein.

The present disclosure encompasses, in a first aspect thereof, a vehicle camera mounting structure. The structure includes a camera which captures an image of an area in front of the vehicle and a headlamp which illuminates an area in front of the vehicle. The camera is secured to the headlamp. The vehicle encompasses a saddle-riding vehicle and an off-road four-wheeled vehicle.

The vehicle camera mounting structure in accordance with the first aspect of the present disclosure can reduce the labor required to adjust the imaging direction of a camera, by allowing the camera to be oriented in alignment concurrently during an aiming process (i.e., adjustment of the illumination direction) for a headlamp. Further, securing the camera to a headlamp, whose vibration values are kept below a certain level, can assist in reducing vibrations to which the camera is subjected, as compared to securing the camera to a bracket that supports a front fork.

Any combinations of at least two features disclosed in the claims and/or the specification and/or the drawings should also be construed as encompassed by the present disclosure. Especially, any combinations of two or more of the claims should also be construed as encompassed by the present disclosure.

BRIEF DESCRIPTION OF THE DRAWINGS

The present disclosure will be more clearly understood from the following description of preferred embodiments made by referring to the accompanying drawings. However, the embodiments and the drawings are given merely for the purpose of illustration and explanation, and should not be used to delimit the scope of the present disclosure, which scope is to be delimited by the appended claims. In the accompanying drawings, alike numerals are assigned to and indicate alike parts throughout the different figures, and:

DESCRIPTION OF EMBODIMENTS

Figure 1:
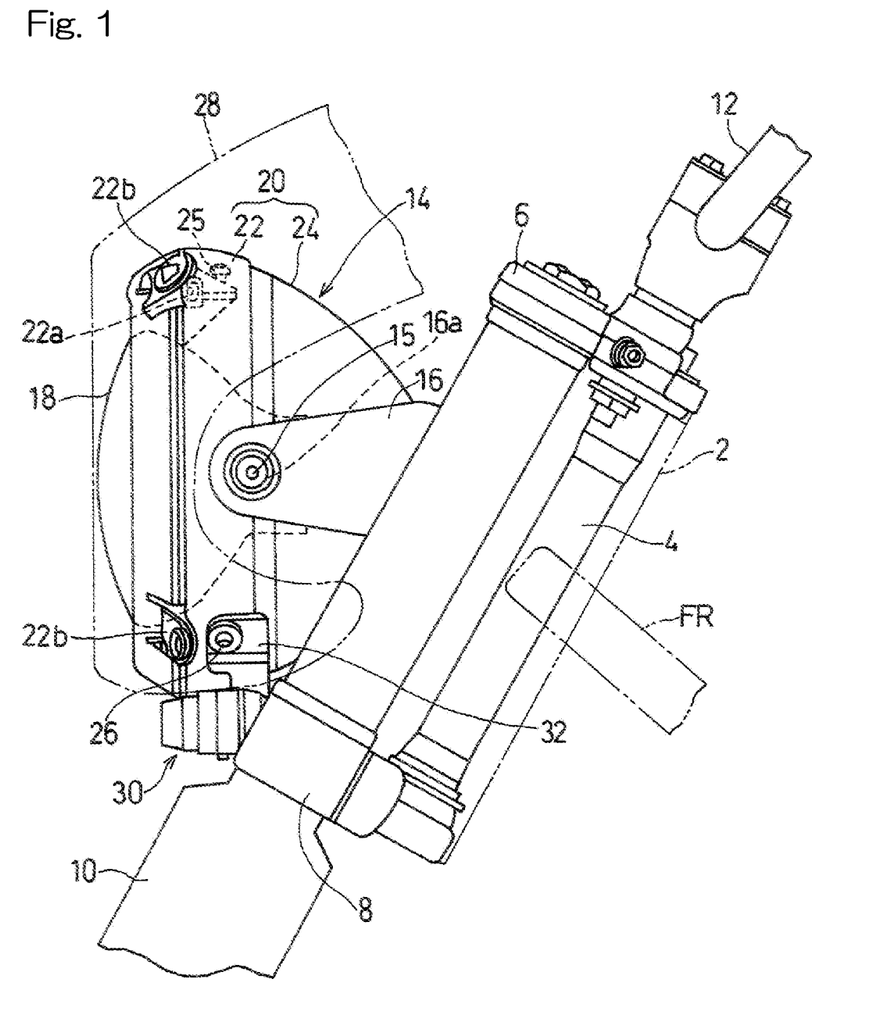
FIG. 1 shows a side view of the front of a motorcycle which represents a vehicle equipped with a vehicle camera mounting structure according to a first embodiment of the present disclosure.
Figure 2:
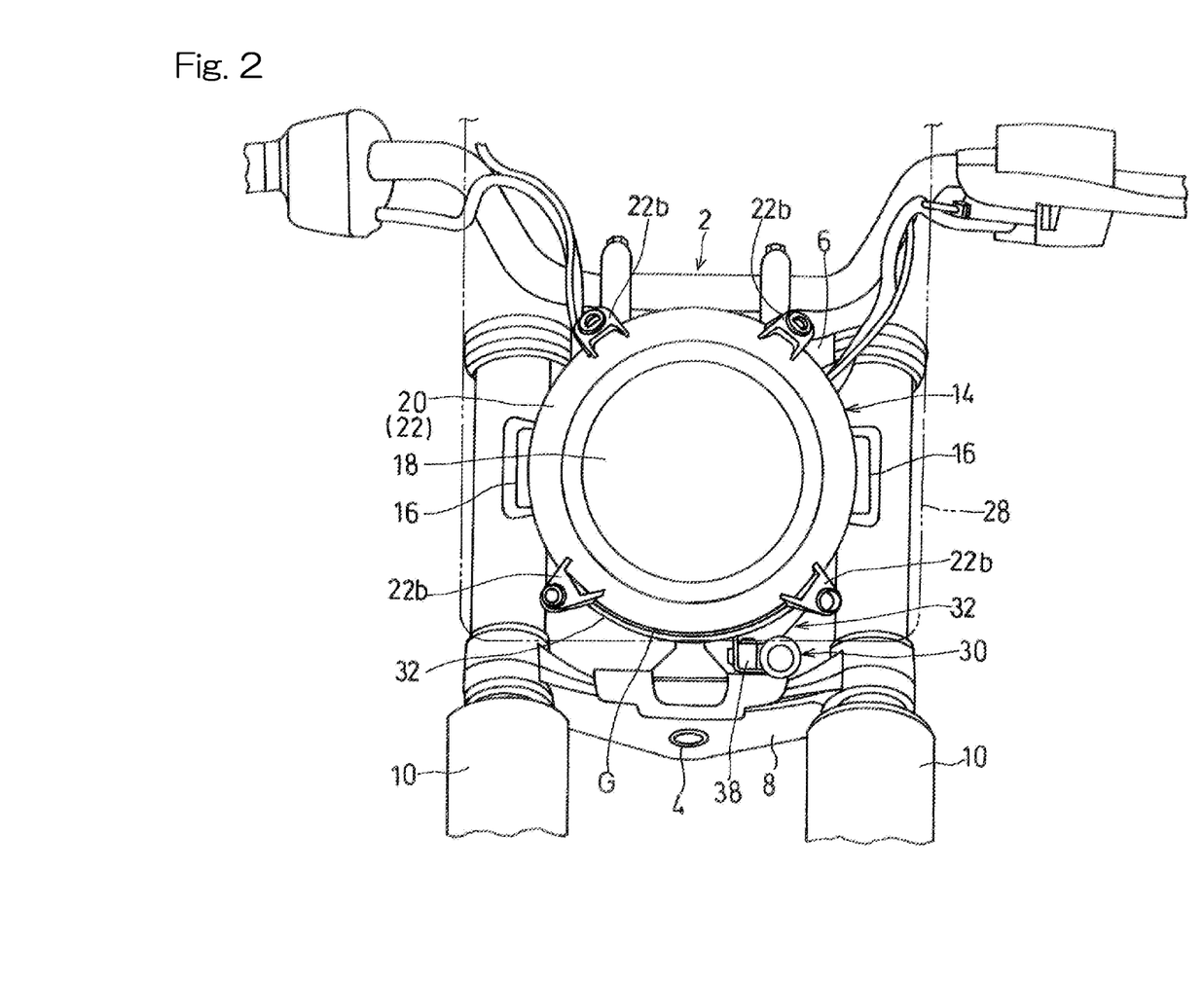
FIG. 2 shows a front elevational view of the front of the motorcycle.

What follows is a description of preferred embodiments of the present disclosure made with reference to the drawings. FIG. 1 shows a side view of the front of a motorcycle which represents a vehicle equipped with a vehicle camera mounting structure according to a first embodiment of the present disclosure. FIG. 2 shows a front elevational view of the same.

In the discussions that follow, the terms "front" and "forward" used herein refer to a side facing the direction of travel of a vehicle, whereas the terms "rear" and "rearward" used herein refer to a side facing a direction counter to the direction of travel of the vehicle. Thus, a longitudinal direction of the vehicle coincides with a front-to-rear or rear-to-front direction. The terms "upper" and "upward" used herein refer to a side facing the top of the vehicle, whereas the terms "lower" and "downward" used herein refer to a side facing the bottom of the vehicle. The terms "left" and "leftward" and the terms "right" and "rightward" used herein refer to sides facing the left and the right of the vehicle, respectively, as viewed from a driver seated in the vehicle. Accordingly, a left-to-right or right-to-left direction coincides with a widthwise direction of the vehicle (hereinafter referred to as a "vehicle widthwise direction"). With respect to the vehicle widthwise direction, a "vehicle widthwise inside" refers to a side facing towards the longitudinally extending centerline of a vehicle body, whereas a "vehicle widthwise outside" refers to a side facing away from the centerline of the vehicle body.

The motorcycle illustrated in FIG. 1 includes a vehicle body frame FR extending in a front-to-rear direction. A power source (not shown) is supported on the vehicle body frame FR. The power source is, for instance, an engine. It should be understood that an engine is merely one of the non-limiting examples of the power source, and the power source may also be an electric motor.

A head pipe 2 is located at a front end of the vehicle body frame FR. A steering shaft 4 is pivotably inserted through the head pipe 2. An upper bracket 6 and a lower bracket 8 are pivoted to the head pipe 2 through the steering shaft 4. A front fork 10 is supported by the upper bracket 6 and the lower bracket 8. A front wheel (not shown) is supported at a lower end of the front fork 10, while a handle 12 is attached to the upper bracket 6 at an upper end of the front fork 10.

The vehicle body frame FR and the head pipe 2 are depicted in dash double-dotted lines in FIG. 1.

A headlamp 14 which illuminates an area in front of the motorcycle is supported on the front fork 10. While, in the instant embodiment, the headlamp 14 uses a light-emitting diode (LED) as a light source, a halogen bulb may also be used. The headlamp 14 is removably mounted to the front fork 10 through lamp brackets 16 using a plurality of fasteners 15 such as bolts.

More specifically, the headlamp 14 is supported on the front fork 10 in a rubber mount configuration that uses elastic elements 17 (FIG. 3) made of, for example, rubber. The elastic elements 17 are, for instance, cylindrical rubber dampers such as the ones illustrated in FIG. 3. It should be understood that this is merely one of the non-limiting examples of the elastic elements 17. The elastic elements 17 limit the transmission of vibrations from a vehicle body to the headlamp 14 so as to keep the vibration values of the headlamp 14 below a prescribed level. Further, the headlamp 14 comes with an aiming feature to allows its orientation (i.e., tilt angle) to be adjusted in a vertical direction and a left-to-right direction.

The headlamp 14 illustrated in FIG. 1 includes: a lamp unit 18 which includes the light source; and a lamp housing 20 enclosing an outer periphery of the lamp unit 18. The lamp unit 18 is housed in the lamp housing 20 with its front side exposed to serve as a light-emitting surface.

The lamp housing 20 includes a front housing component 22 that forms a front half of the lamp housing 20 and a rear housing component 24 that forms a rear half of the lamp housing 20. The lamp unit 18 is detachably fastened to the front housing component 22 by means of a plurality of fasteners 25 such as bolts.

The front housing component 22 and the rear housing component 24 are detachably coupled to each other. More specifically, engagement pawls 24a (FIG. 3) formed on an upper section of the rear housing component 24 are snapped into engagement openings 22a formed in an upper section of the front housing component 22 to couple the upper sections of the front housing component 22 and the rear housing component 24 together. Meanwhile, a lower section of the front housing component 22 and a lower section of the rear housing component 24 are coupled together by means of fasteners 26 such as bolts. There are two coupling sites which are spaced apart in the vehicle widthwise direction for each of upper and lower sections of the lamp housing 20. The coupling features for the lower section of the lamp housing 20 will be discussed later in detail.

Figure 3:
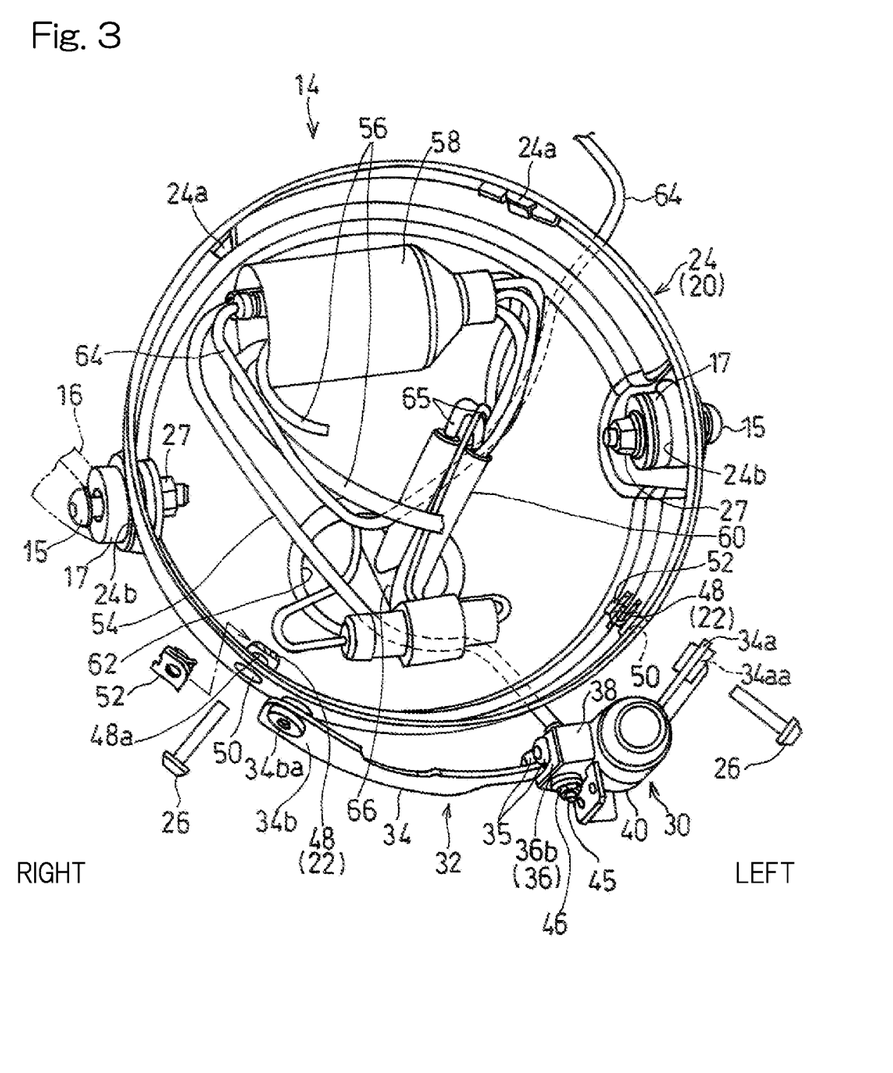
FIG. 3 shows a perspective view of the interior of a lamp housing of a headlamp of the motorcycle.

As illustrated in FIG. 3, the rear housing component 24 of the lamp housing 20 has opposite lateral sides, both of which are formed therein with attachment holes 24b. The cylindrical elastic elements 17 are fitted in the attachment holes 24b. The fasteners 15 are inserted laterally from outside through bolt insertion holes 16a (FIG. 1) in the lamp brackets 16 and hollow bores in the elastic elements 17, and then, tightened with nuts 27 so as to have the headlamp 14 supported on the front fork 10 through the lamp brackets 16. Accordingly, the rear housing component 24 forms a support unit which allows the lamp unit 20 to be supported on the vehicle body.

A front cowl 28 made of resin is fitted on the headlamp 14 illustrated in FIG. 1 so as to cover the headlamp 14 from the front. In the instant embodiment, the front cowl 28 covers the headlamp 14 from the front and the top, and partially from the sides. In other words, the front cowl 28 in the instant embodiment is a small cowl (or a so-called bikini cowl) that only covers a circumferential region of the headlamp 14 and leaves uncovered those components and a part of the vehicle body which are positioned rearwards of the front fork 8 when seen in a side view. It should be understood that a bikini cowl-type motorcycle is merely one of the non-limiting examples of a motorcycle according to the present disclosure.

The front cowl 28 in the instant embodiment is fixed with fasteners (not shown) such as bolts to lamp support sites 22b that are formed on the front housing component 22 of the lamp housing 20. In the instant embodiment, as illustrated in FIG. 2, a total of four lamp support sites 22b are provided on the front face of the front housing component 22 at the upper and lower lateral sides thereof. It should be understood that this is merely one of the non-limiting examples of a support configuration for the front cowl 28.

As illustrated in FIG. 1, a camera 30 which captures an image of an area in front of the vehicle is disposed below the headlamp 14. The camera 30 in the instant embodiment is a camera for drive recorder purposes. It should be understood that it may also be a camera for use other than drive recorder purposes.

The camera 30 is arranged such that its upper end is positioned above a lower end of the headlamp 14 in a vertical direction. Also, the camera 30 is arranged such that its entirety is positioned behind a front end of the headlamp 14 in a front-to-rear direction. Such an arrangement allows the camera 30 to be covered from the top by the headlamp 14 and the front cowl 28 fitted on the headlamp 14, providing protection to the camera 30. Further, the camera 30 is arranged outside of a center of the lamp housing 20 of FIG. 2 in a vehicle widthwise direction. In the instant embodiment, the camera 30 is arranged somewhat on the left side of the lamp housing 20. Furthermore, the camera 30 is positioned not within the lamp housing 20, but outside the lamp housing 20.

The camera 30 is secured to the headlamp 14. Iin the instant embodiment, the camera 30 is secured to a lower end of the headlamp 14. In particular, the camera 30 is secured to the rear housing component 24 of the lamp housing 20 (i.e., the support unit).

Figure 4:
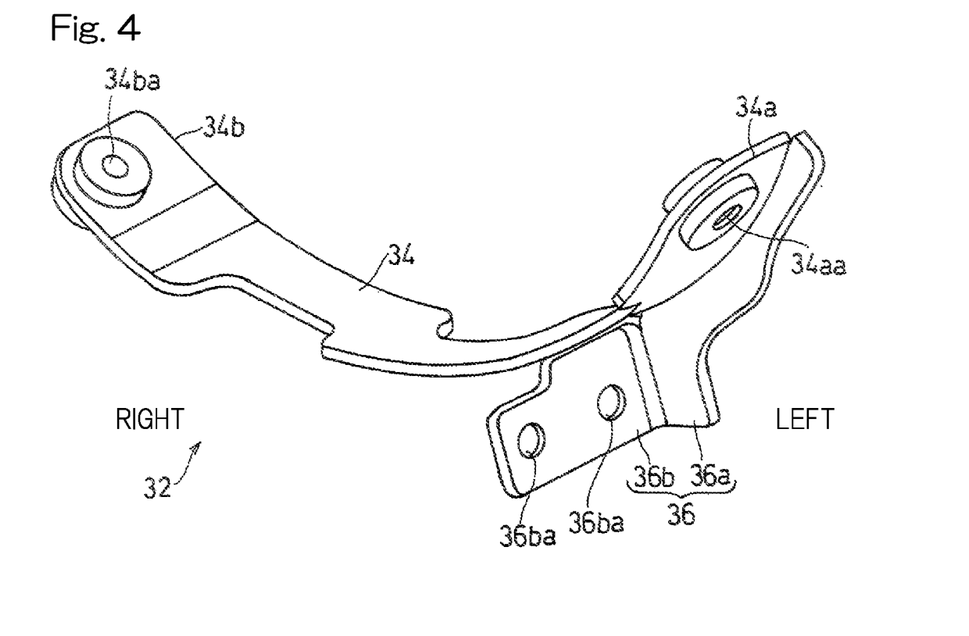
FIG. 4 shows a perspective view of a camera bracket which supports a camera.

The camera 30 is supported on the headlamp 14 through a camera bracket 32. The camera bracket 32 in the instant embodiment is formed of a bent or welded sheet metal, for example. As illustrated in FIG. 4, the camera bracket 32 includes a first bracket part 34 extending in a left-to-right direction (i.e., a vehicle widthwise direction) along a lower edge of the headlamp 14. The first bracket part 34 has opposite left and right ends 34a, 34b which are formed therein with respective bolt insertion holes 34aa, 34ba.

The camera bracket 32 also includes a second bracket part 36 extending downwards from the left end 34a of the first bracket part 34. The second bracket part 36 includes a first plate 36a having a principle face oriented in a front-to-rear direction and a second plate 36b having a principle face oriented in a vehicle widthwise direction (i.e., a left-to-right direction).

The second plate 36 is formed therein with camera mounting holes 36ba. The camera mounting holes 36ba are through holes facing in a vehicle widthwise direction. There are two camera mounting holes 36ba provided in a row in a front-to-rear direction in the instant embodiment. It should be understood that the number of the camera mounting holes 36ba is not so limited.

Figure 5:
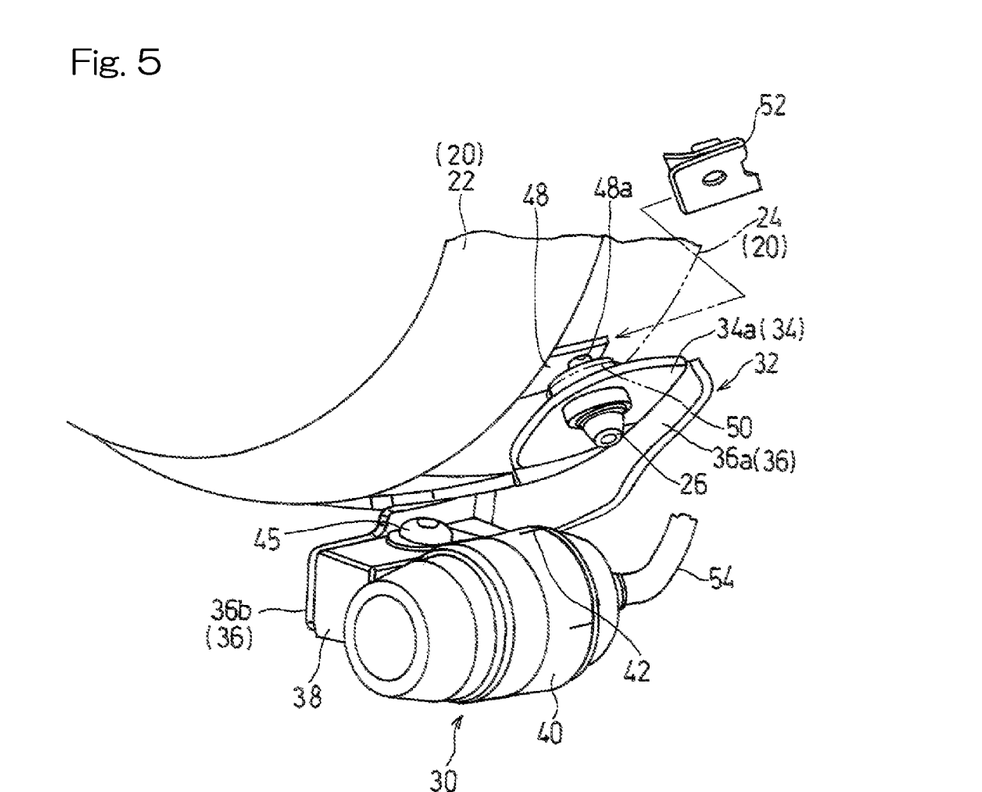
FIG. 5 shows a perspective view of the vehicle camera mounting structure as seen diagonally and laterally from the front.

A camera carrier 38 illustrated in FIG. 5 is fitted via the camera mounting holes 36ba. The camera carrier 38 comprises a sheet material that is bent into a cuboidal shape, and is detachably fastened to the camera bracket 32 via the camera mounting holes 36ba by means of fasteners 35 (FIG. 3) such as bolts.

The camera 30 is attached to the camera carrier 38 through a strap-like holder 40. In particular, the holder 40 is wrapped around an outer periphery of the camera 30 and is fixed to the camera carrier 38 at the opposite ends of the holder 40 by means of a fastener 45 such as a bolt. In the instant embodiment, the fastener 45 comprises a bolt 45 extending through the camera carrier 38 in a vertical direction and a nut 46 of FIG. 3 which tightens the same.

Figure 6:
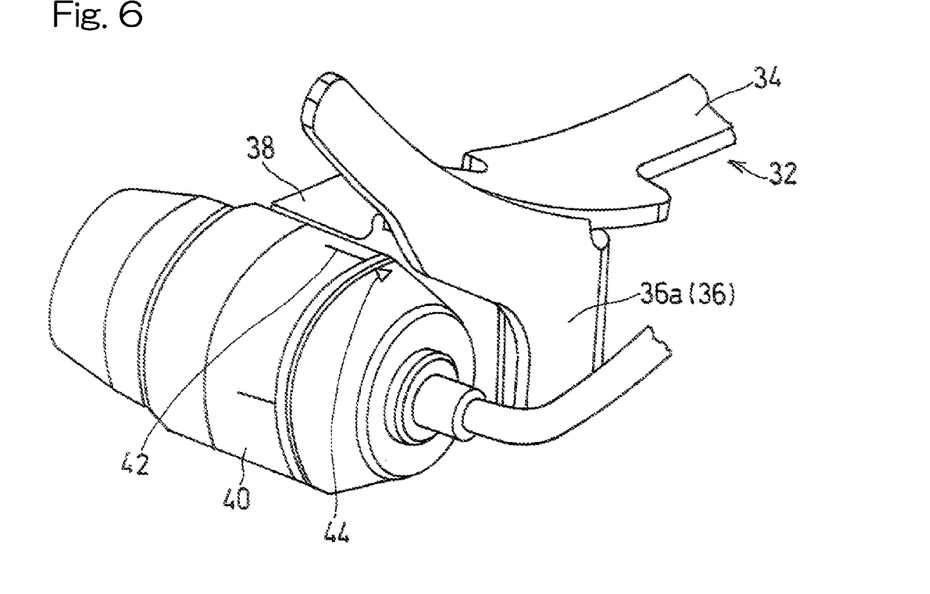
FIG. 6 shows a perspective view of the vehicle camera mounting structure as seen diagonally and laterally from the rear.

In the instant embodiment, the holder 40 has a surface on which an indicator 42 of FIG. 5 is formed. The indicator 42 is, for example, a line drawn on the surface of the article with a scribing tool. As illustrated in FIG. 6, the camera 30 has a rear side that is similarly provided with an indicator 44. The indicator 44 comprises, for example, a triangular mark that is applied with a paint or affixed. The camera 30 can be positioned in a circumferential direction or brought into angular alignment by matching the indicator 42 on the holder 40 with the indicator 44 on the camera 30 when attaching the camera 30 to the camera carrier 38. These illustrated features are only some of the non-limiting examples of the indicators 42, 44.

Now, the features for fitting the camera bracket 32 to the headlamp 14 will be described. As illustrated in FIG. 3, the camera bracket 32 is fitted to the lamp housing 20 by means of the fasteners 26. In particular, the camera bracket 32 is clamped together with the rear housing component 24 to the front housing component 22 by means of the fasteners 26. The details will be described as follows.

As illustrated in FIG. 5, the front housing component 22 is formed thereon with first attachment pieces 48. The first attachment pieces 48 protrude from a rear end of the front housing component 22 towards the rear; in particular, the first attachment pieces 48 protrude towards the interior of the rear housing component 24. As illustrated in FIG. 3, there are two, first attachment pieces 48 provided at the lower section of the lamp housing 20 and spaced apart in a left-to-right direction. The first attachment pieces 48 are formed therein with first insertion holes 48a. It should be noted that, while FIG. 3 depicts the interior of the rear housing component 24, it also shows in a cross-sectional view how the first attachment pieces 48 protrude from the front housing component 22 towards the interior of the rear housing component 24.

The rear housing component 24 is formed therein with second insertion holes 50 that are located to correspond to the first insertion holes 48a in the first attachment pieces 48. Clip nuts 52 are fitted onto the first attachment pieces 48. Then, the fasteners 26 are inserted diagonally from vehicle widthwise outside and below through the bolt insertion holes 34aa, 34ba of the camera bracket 32, the second insertion holes 50 of the rear housing component 24, and the first insertion holes 48a of the front housing component 22, and are tightened with the clip nuts 52.

In this way, the camera 30 is clamped together with the rear housing component 24 through the camera bracket 32 to the front housing component 22. In FIG. 3, the right one of the clip nuts 52 is shown removed from one of the first attachment pieces 48, whereas the left one of the clip nuts 52 is shown fitted onto the other of the first attachment pieces 48.

As illustrated in FIG. 2, the first bracket part 34 of the camera bracket 32 extends below and along the headlamp 14. There is plenty of gap G formed between the first bracket part 34 and the lower edge of the headlamp 14. In this way, it is possible to prevent the headlamp 14 fitted with the rubber mounts 17 (FIG. 3) from causing interference with the camera bracket 32.

Turning to FIG. 3, how the camera 30 and the headlamp 14 are wired will be described. A harness 54 for the camera 30 or camera harness 54 and a harness 56 for the headlamp 14 or headlamp harness 56 are bundled together and are extended towards the rear of the vehicle body. In the instant embodiment, the camera harness 54 and the headlamp harness 56 are connected to one end side (i.e., a left side of FIG. 3) of a common connector 58 positioned within the lamp housing 20. Harnesses on the other end side (i.e., a right side of FIG. 3) of the connector 58 are bundled together into a shared harness 60 which, in turn, connects to a main harness (not shown). The details will be described as follows:

The camera harness 54 is extended diagonally upwards from a rear side of the camera 30 and then, is guided into the interior of the lamp housing 20 through a rear side opening 62 of the rear housing component 24 of the lamp housing 20. After being guided into the interior of the lamp housing 20, the camera harness 54 is connected to the one end side of the connector 58 which is positioned within the lamp housing 20 for the headlamp harness 56.

In the instant embodiment, a harness 64 for a drive recorder switch for the camera 30 is also connected to the connector 58. The drive recorder switch (not shown) is attached to the handle 12, for example. The harness 64 for the drive recorder switch is extended downwards from the handle 12, guided into the interior of the lamp housing 20 through the opening 62 of the lamp housing 20, and connected to the one end side of the connector 58.

As described above, different hardnesses extending from the other end side of the connector 58 are bundled together into the shared harness 60. In the instant embodiment, one or more other harnesses not extending from the other end side of the connector 58 are also bundled into the shared harness 60. Such harnesses include, for example, a low electricity harness such as an ETC antenna harness at the front side of the vehicle body.

The harness 60, in which the camera harness 54 and the headlamp harness 56 are bundled, is guided out of the lamp housing 20 through the opening 62 of the lamp housing 20 and connects to the main harness (not shown) together with a harness (not shown) for a meter unit. The camera harness 54 and the headlamp harness 56 may be bundled together differently than in the instant embodiment.

The configuration described thus far can reduce the labor required to adjust the imaging direction of the camera 30, by allowing the camera 30 to be oriented in alignment concurrently during an aiming process for the headlamp 14. Further, securing the camera 30 to the headlamp 14, whose vibration values are kept below a certain level, can assist in reducing vibrations to which the camera 30 is subjected, as compared to securing the camera to the brackets 6, 8 that support the front fork 10.

In a camera mounting structure according to the present disclosure, the camera 30 may be secured to the lower end of the headlamp 14. According to this configuration, the camera 30 can be covered from the top by the headlamp 14 such that the headlamp 14 facilitates protection of the camera 30, thereby preventing foreign matters and others from colliding with the camera 30 and undesirably bringing the camera 30 out of alignment during driving.

In a camera mounting structure according to the present disclosure, the camera 30 may be secured to the support unit of the headlamp 14, in particular, the rear housing component 24. According to this configuration, the camera 30 can be supported by the rear housing component 24 which also provides support of the lamp unit 18, thereby allowing the camera 30 to be securely supported.

In a camera mounting structure according to the present disclosure, the camera 30 may be clamped together with the rear housing component 24 to the front housing component 22. According to this configuration, no additional mount needs to be provided for securing the camera 30, thereby resulting in a simplified design.

In a camera mounting structure according to the present disclosure, the connector 58 to which the camera harness 54 and the headlamp harness 56 are connected, may be positioned within the lamp housing 20. According to this configuration, the camera harness 54 and the headlamp harness 56 can be bundled together into the single shared harness 60, thereby making wiring easier.

In a camera mounting structure according to the present disclosure, the camera 30 may be positioned outside the lamp housing 20. According to this configuration, since the camera 30 is positioned outside the lamp housing 20, attachment and detachment of the camera 30 are easy. Further, the size of the headlamp 14 can be reduced, as compared to that when the camera 30 is positioned within the lamp housing 20.

A camera mounting structure according to the present disclosure can find use in saddle-riding vehicles including motorcycles, three-wheeled vehicles, four-wheeled buggies (or all-terrain vehicles), and small planing boats. In particular, the camera mounting structure in the instant embodiment is suitably used in naked-type motorcycles with an externally exposed headlamp, or motorcycles with a small bikini cowl which covers around a headlamp. Moreover, the camera mounting structure in the instant embodiment is also applicable to off-road four-wheeled vehicles that can travel on irregular terrains, such as recreation utility vehicles and utility vehicles (or multi-purpose four-wheeled vehicles).

The above-described configurations are only some of the non-limiting configurations of the present disclosure. Numerous additions, modifications, or omissions can be made therein without departing from the principle of the present disclosure, and are, thus, encompassed within the scope of the present disclosure.

What is claimed is:

1. A vehicle headlamp camera mounting structure, the structure comprising:
    a camera which captures an image of an area in front of a vehicle;
    a headlamp which illuminates an area in front of the vehicle, the camera being secured to the headlamp; and
    a connector to which a camera harness and a headlamp harness are connected, wherein
    the headlamp includes a lamp unit and a lamp housing enclosing an outer periphery of the lamp unit, and
    the connector is positioned within the lamp housing.

2. The vehicle headlamp camera mounting structure as claimed in claim 1, wherein the camera is secured to a lower end of the headlamp.

3. The vehicle headlamp camera mounting structure as claimed in claim 1, wherein
    the headlamp further includes a support unit configured to allow the lamp unit to be supported on the vehicle, and
    the camera is secured to the support unit of the headlamp.

4. The vehicle headlamp camera mounting structure as claimed in claim 1, wherein
    the camera is clamped together with the lamp housing to the lamp unit.

5. The vehicle headlamp camera mounting structure as claimed in claim 1, wherein the camera is positioned outside the lamp housing.

6. A saddle-riding vehicle comprising the vehicle headlamp camera mounting structure as claimed in claim 1.

7. An off-road four-wheeled vehicle comprising the vehicle headlamp camera mounting structure as claimed in claim 1.

8. A vehicle headlamp camera mounting structure, the structure comprising:
    a camera which captures an image of an area in front of a vehicle; and
    a headlamp which illuminates an area in front of the vehicle, the camera being secured to the headlamp, wherein
    the headlamp includes a lamp unit and a lamp housing enclosing an outer periphery of the lamp unit,
    the lamp housing includes a front housing component that forms a front half of the lamp housing and a rear housing component that forms a rear half of the lamp housing,
    the lamp unit is detachably fastened to the front housing component,
    the front housing component and the rear housing component are detachably coupled to each other by a fastener, and
    the camera is clamped together with the rear housing component to the front housing component by the fastener.

* * * * *